(12) United States Patent
Farrugia

(10) Patent No.: US 9,128,396 B2
(45) Date of Patent: Sep. 8, 2015

(54) CHEMICAL BINDING OF RENEWABLE OILS TO POLYESTER EMULSION

(71) Applicant: XEROX CORPORATION, Norwalk, CT (US)

(72) Inventor: Valerie M. Farrugia, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 27 days.

(21) Appl. No.: 14/189,411

(22) Filed: Feb. 25, 2014

(65) Prior Publication Data

US 2014/0178811 A1  Jun. 26, 2014

Related U.S. Application Data

(62) Division of application No. 13/559,928, filed on Jul. 27, 2012, now Pat. No. 8,703,379.

(51) Int. Cl.
| | |
|---|---|
| *G03G 9/087* | (2006.01) |
| *G03G 9/08* | (2006.01) |
| *C08G 81/00* | (2006.01) |
| *C08G 63/91* | (2006.01) |

(52) U.S. Cl.
CPC ............ *G03G 9/0874* (2013.01); *C08G 63/916* (2013.01); *C08G 81/00* (2013.01); *G03G 9/08* (2013.01); *G03G 9/0804* (2013.01); *G03G 9/08753* (2013.01); *G03G 9/08755* (2013.01); *G03G 9/08768* (2013.01); *G03G 9/08775* (2013.01); *G03G 9/08782* (2013.01)

(58) Field of Classification Search
CPC .......... G03G 9/08755; G03G 9/08797; G03G 9/08775
See application file for complete search history.

(56) References Cited

U.S. PATENT DOCUMENTS

| | | |
|---|---|---|
| 3,590,000 A | 6/1971 | Palermiti et al. |
| 4,558,108 A | 12/1985 | Alexandru et al. |
| 5,227,460 A | 7/1993 | Mahabadi et al. |
| 5,290,654 A | 3/1994 | Sacripante et al. |
| 5,302,486 A | 4/1994 | Patel et al. |
| 5,308,734 A | 5/1994 | Sacripante et al. |
| 5,370,963 A | 12/1994 | Patel et al. |
| 5,510,220 A | 4/1996 | Nash et al. |
| 5,593,807 A | 1/1997 | Sacripante et al. |
| 5,853,943 A | 12/1998 | Cheng et al. |
| 5,902,710 A | 5/1999 | Ong et al. |
| 5,910,387 A | 6/1999 | Mychajlowskij et al. |
| 5,916,725 A | 6/1999 | Patel et al. |
| 5,919,595 A | 7/1999 | Mychajlowskij et al. |
| 5,925,488 A | 7/1999 | Patel et al. |
| 5,977,210 A | 11/1999 | Patel et al. |
| 5,994,020 A | 11/1999 | Patel et al. |
| 6,177,221 B1 | 1/2001 | Maniar et al. |
| 6,319,647 B1 | 11/2001 | Gutman et al. |
| 6,365,316 B1 | 4/2002 | Stamp et al. |
| 6,416,916 B1 | 7/2002 | Silence et al. |
| 7,029,817 B2 | 4/2006 | Robinson et al. |
| 2008/0107989 A1 | 5/2008 | Sacripante et al. |
| 2008/0153027 A1 | 6/2008 | Veregin et al. |
| 2009/0011355 A1 * | 1/2009 | Shibai ........................ 430/109.1 |
| 2011/0129774 A1 | 6/2011 | Farrugia et al. |
| 2013/0338330 A1 * | 12/2013 | Nakagawa et al. ............. 528/65 |

OTHER PUBLICATIONS

U.S. Appl. No. 11/094,413, filed Mar. 31, 2005 by Allan K. Chen et al.
Shevachman et al., "Chemical Binding of Jojoba Liquid Wax to Polyethylene," Journal of the American Oil Chemists' Society, vol. 78, No. 3, pp. 223-228, 2001.
Siiani, "Functionalization at the Double Bond Region of Jojoba Oil: 1. Bromine Derivatives," Journal of the American Oil Chemists' Society, pp. 845-850, Sep. 1981.
Avidon et al., "Functionalization at the Double Bond Region of Jojoba Oil. 6. Production of Amines via Azides," Journal of the American Oil Chemists' Society, vol. 71, No. 9, pp. 993-997, Sep. 1994.

* cited by examiner

*Primary Examiner* — Hoa V Le
(74) *Attorney, Agent, or Firm* — Pillsbury Winthrop Shaw Pittman LLP

(57) ABSTRACT

Methods for making toner particles comprising a polyester-wax resin, wherein the polyester-wax resin includes a bio-based oil that is chemically incorporated into the main chain of the polyester resin. The toner particles may be formed using emulsion aggregation methods. A toner formed from the toner particles may be used in low-oil or oil-less fusing systems.

19 Claims, No Drawings

CHEMICAL BINDING OF RENEWABLE OILS TO POLYESTER EMULSION

This application is a divisional application of U.S. patent application Ser. No. 13/559,928 filed Jul. 27, 2012, the entire disclosure of which is incorporated herein by reference.

TECHNICAL FIELD

Disclosed herein is a method for forming a polyester emulsion, a method for forming a toner particle, and toner particles formed from that method.

BACKGROUND

Emulsion aggregation (EA) is a method for preparing toners. EA techniques involve forming an emulsion latex of resin particles by heating the resin using a batch or semi-continuous emulsion polymerization, as disclosed in, for example, U.S. Pat. No. 5,853,943, the disclosure of which is hereby incorporated by reference in its entirety. Other examples of emulsion/aggregation/coalescing methods for preparing toners are illustrated in U.S. Pat. Nos. 5,902,710; 5,910,387; 5,916,725; 5,919,595; 5,925,488, 5,977,210, 5,994,020, and U.S. Patent Application Publication No. 2008/0107989, the disclosures of each of which are hereby incorporated by reference in their entirety.

EA toners are sometimes used in forming print and/or xerographic images. Polyester EA ultra low melt (ULM) toners have been prepared utilizing amorphous and crystalline polyester resins as illustrated, for example, in U.S. Patent Application Publication No. 2008/0153027, the disclosure of which is hereby incorporated by reference in its entirety. Incorporating these polyesters into the toner generally requires that the polyesters first be formulated into latex emulsions prepared by solvent containing batch methods, for example solvent flash emulsification and/or solvent-based phase inversion emulsification (PIE).

Oils or waxes are sometimes used to aid in toner release during fusing, and to prevent the fused image document from curling around the fuser roll. However, using oils in a fusing system may cause differential gloss due to oil remaining on the surface of fused prints. A low-oil, or oil-less, fuser system may alleviate issues such as caused by toner-fuser oil interactions, oil contamination, and the like.

A wax may be necessary for a low-oil fuser to function. Waxes aid in preventing document offset, which may occur where fused images become transferred from one document to another (toner-to-toner and toner-to-paper) over a prolonged period of time or at elevated temperatures. In addition, waxes may be added to toner formulations to reduce stripper finger marks, such as scratch marks and changes in image gloss, on the fused images.

Wax is typically added up front with pigment and polyester latex in EA toner methods as a separate, aqueous emulsion. The wax emulsion mixes and aggregates throughout the toner particle formation step. When added as a separate entity during aggregation and coalescence of toner particles, the wax may be rejected by the emulsion or may be incompatible with other toner components. In addition, adding a wax as a separate entity may result in uneven distribution of wax domains throughout toner particles and high wax content on particle surface.

Adding a wax as part of the polyester resin may avoid the separate emulsification step of the bio-based oil and, thus, may reduce the cost of EA toner.

U.S. Patent Application Publication No. 2011/0129774, now abandoned, discloses incorporating an oil component directly into the polyester during the phase inversion emulsification (PIE) stage. However, the oil component in that application was not bonded chemically to the resin, and no covalent bonds were formed. Instead, the oil component was physically trapped inside the core of the latex aggregates. Thus, the oil may flow out of the core making it difficult to control the domains of the wax, or control how the wax is dispersed throughout the toner. Accordingly, a need exists for a method of chemically incorporating a wax into the main chain of a polyester.

SUMMARY

Described in embodiments is a method including the steps of forming a polyester-wax resin emulsion by epoxidizing unsaturated units of a polyester resin, synthesizing an amino-functionalized bio-based oil, and chemically bonding the amino-functionalized bio-based oil to the epoxidized units of the polyester resin; forming a pre-toner mixture comprising the polyester-wax resin emulsion; and aggregating and coalescing the pre-toner mixture to form the toner particles.

Toner particles comprising a polyester-wax resin made according to methods described herein may be used in an oil-less fusing fixture, without adversely affecting the xerographic device. Chemically incorporating the wax into the resin may eliminate the need for a separate wax emulsification step, may avoid wax rejection during the aggregation/coalescing method, and may provide better control over domains of the wax and over how the wax is dispersed throughout the toner.

EMBODIMENTS

Methods of making toner particles are described herein, wherein the toner particles may comprise a polyester-wax resin, and the bio-based oil may be a bio-based oil that is chemically incorporated into the main chain of the polyester resin. The toner particles may further include a colorant and other conventional toner additives.

Embodiments provide a unique method of chemically attaching a liquid bio-based oil such as, for example, jojoba oil, to a polyester chain. The resulting polyester-wax resin includes a bio-based oil that is chemically incorporated into the main chain of the polyester resin, such as a pendent molecule. The method disclosed herein includes epoxidizing a vinyl functional group in a polyester resin, synthesizing amino derivatives of the bio-based oil, and covalently attaching the polyester resin to the amino derivatives of the bio-based oil.

A bio-based oil incorporated into the main chain of a polyester may allow for a toner to be made without the use of an external or second wax emulsion, while allowing the toner to be capable of use in low-oil or oil-less fusing systems. By omitting the second or separate wax emulsion, the cost and time necessary for forming the toner particles is decreased. Further, as compared to physically incorporating a bio-based oil into a polyester resin, a bio-based oil chemically incorporated into the main chain of a polyester may be more intact within the toner particle and less likely to flow to the surface of the toner particle.

As discussed above, this resin design allows for a toner method that does not include a second or separate wax emulsion and also provides the use of oil-less fusing or low-oil fusing system. From an environmental perspective, omitting any external or second wax emulsion may limit the amount of surfactants or organic solvents used as compared to conventional methods not using the polyester-wax resin disclosed herein.

The polyester-wax resin may have an acid value ranging from about 5 to about 40, or from about 10 to about 35, or from about 15 to about 30, depending on the degree of polymerization and the overall stoichiometry of the diol to diacid monomers ratio. If the polyester-wax resin has an excess diacid monomer ratio, the resin will have high acid values. However, if the diol monomer is used in excess, then the acid value will be low, such as about 5. The functionality of the wax (whether it includes an acidic group or a hydroxyl group) will only be part of the overall monomers used in making the resin.

The polyester-wax resin may be obtained through the condensation of a diol, a diacid, and a bio-based oil comprised of one or two functional groups either or both being a carboxylic acid group or hydroxyl group. The bio-based oil is chemically bound through esterification to the polyester resin on the main chain of the polymer, including the end unit of the polymer. As explained above, any wax is suitable for use in deriving the polyester-wax resin described herein so long as it has one or two functional groups, that is, the wax may have one hydroxyl functional end group, one acidic functional end group, two hydroxyl functional end groups, two acidic functional end groups, or one hydroxyl functional end group and one acidic functional end group.

Bio-Based Oil

In embodiments, a bio-based oil is added to a polyester resin to form a polyester-wax resin. A phase inversion method may be used to incorporate the bio-based oil in the core of the polyester resin, such as a latex resin.

The bio-based oil may include hydrogenated and non-hydrogenated vegetable oils extracted from plants such as, for example, jojoba oil, coconut oil, corn oil, cottonseed oil, olive oil, palm oil, palm kernel oil, rapeseed oil, almond oil, cashew oil, hazelnut oil, peanut oil, macadamia oil, mongongo oil, pine nut oil, pistachio oil, walnut oil, bottle gourd oil, buffalo gourd oil, pumpkin seed oil, watermelon seed oil, acai oil, blackcurrant seed oil, borage seed oil, evening primrose oil, carob pod oil, amaranth oil, apricot oil, apple seed oil, argan oil, artichoke oil, avocado oil, babassu oil, ben oil, borneo tallow nut oil, cape chestnut oil, cocoa butter, algaroba oil, cocklebur oil, poppyseed oil, cohune oil, dika oil, false flax oil, flax seed oil, soybean oil, sunflower oil, grape seed oil, hemp oil, kapok seed oil, lallemantia oil, marula oil, meadowfoam seed oil, mustard oil, nutmeg butter, nutmeg oil, okra seed oil, papaya seed oil, perilla seed oil, pequi oil, pine nut oil, poppyseed oil, prune kernel oil, quinoa oil, ramtil oil, rice bran oil, royle oil, sacha inchi oil, camellia oil, thistle oil, tomato seed oil, wheat germ oil, tung oil, linseed oil, safflower oil, sesame oil, combinations thereof, and the like.

The bio-based oil may include eicosenoic acids and alcohols, such as eicosenol and docosenol. The eicosenoic acids and alcohols may be present in the bio-based oil in an amount of from about 1 to 30% by weight of the bio-based oil, such as from 2 to 15% by weight of the bio-based oil, or from about 3 to 10% by weight of the bio-based oil.

In embodiments, a natural-based, environmentally friendly jojoba oil (obtained from Simmondsia chinensis; commercially available from Sigma Aldrich) may be utilized as the bio-based oil. The jojoba oil may be partially hydrogenated and/or isomerized, and includes long chain esters having mainly 40-42 carbon atoms where the carboxy-esteric group is contained within the high lipophilic chain.

In embodiments, synthetically made jojoba oil may be used and includes a mixture of esters of long chain monounsaturated acids and alcohols having 16-26 carbon atoms, e.g. esters of oleic acid and erucic acid with oleic alcohol or erucyl alcohol. Jojoba oil is stable toward oxygen and high temperatures due to its chemical structure, and it is less reactive when compared with other olefins. Additionally, oxidation at the allylic position is very slow or not existent, so it is a good candidate as a release aid in toner formulations.

In embodiments, the bio-based oil is present in an amount of from about 0.1% by weight to about 25% by weight of the total toner particle, such as from about 1% by weight to about 15% by weight, such as from about 2% by weight to about 10% by weight. In addition, the bio-based oil may be present in the polyester-wax resin in an amount of from about 1 weight percent to about 20 weight percent of the total resin, such as from about 3 weight percent to about 18 weight percent, or from about 5 weight percent to about 15 weight percent of the total resin.

In embodiments, the bio-based oil may be in the form of oil droplets. Without any type of mixing, shaking, and the like, the oil droplets may have a size of from about 0.5 μm to about 500 μm in diameter, such as from about 1 μm to about 250 μm in diameter, or from about 10 μm to about 60 μm in diameter.

Polyester Resin

The polyester resin of the polyester-wax resin may be synthesized to have high acid numbers, such as high carboxylic acid numbers, of, for example, 40 mg/eq. KOH. For example, if the polyester-wax resin formed according to the methods described herein is to be used to form toner particles by an emulsion aggregation method, then the polyester resin and resulting polyester-wax resin may have a high acid number of, for example, from about 5 mg/eq. KOH to about 40 mg/eq. KOH, such as from about 10 mg/eq. KOH to about 30 mg/eq. KOH, or from about 13 mg/eq. KOH to about 22 mg/eq. KOH.

The polyester resin may be a polyester resin made to have a high acid number by using an excess amount of diacid monomer to the diol monomer, or by using acid anhydrides to convert the hydroxl ends to acidic ends, for example, by reaction of the polyester resin with known organic anhydrides such as trimellitic anhydride, phthalic anhydride, dodecyl succinic anhydride, maleic anhydride, 1,2,4,5-benzenedianhydride. 5-(2,5-dioxotetrahydrol)-3-methyl-3-cyclohexene-1,2-dicarboxylic anhydride, 5-(2,5-dioxotetrahydrol)-4-methyl-3-cyclohexene-1,2-dicarboxylic anhydride, pyromellitic dianhydride, benzophenone dianhydride, biphenyl dianhydride, bicyclo[2,2,2]-oct-7-ene tetracarboxylic acid dianhydride, cis,cis,cis,cis,1,2,3,4-cyclopentane tetracarboxylic acid dianhydride, ethylenediamine tetracetic acid dianhydride, 4,4'-oxydiphthalic anhydride, 3,3',4,4'-diphenylsulfone tetracarboxylic dianhydride, ethylene glycol bis-(anhydro-trimellitate), propylene glycol bis-(anhydro-trimellitate), diethylene glycol bis-(anhydro-trimellitate), dipropylene glycol bis-(anhydro-trimellitate), triethylene glycol bis-(anhydro-trimellitate), tripropylene glycol bis-(anhydro-trimellitate), tetraethylene glycol bis-(anhydro-trimellitate), glycerol bis-(anhydro-trimellitate), and mixtures thereof.

A hydroxyl-terminated polyester resin may be converted to a high acid number polyester by reacting the hydroxyl-terminated polyester with multivalent polyacids, such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetraearboxylic acid; acid anhydrides of multivalent polyacids; and lower alkyl esters of multivalent polyacids;

multivalent polyols, such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like.

In embodiments, the polyester resin may be, for example, poly(1,2-propylene-diethylene)terephthalte, polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexylene-adipate polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate, polyethylene-pimelate, polypropylene-pimelate, polybutylene-pimelate, polypentylene-pimelate, polyhexylene-pimelate, polyheptadene-pimelate, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), or mixtures thereof.

In embodiments, if the polyester-wax resin is to be used in a UV curable toner, then the polyester resin of the polyester-wax resin may be an unsaturated polyester. Unsaturated polyester resins may include any of various polyesters, such as SPAR™ (Dixie Chemicals), BECKOSOL™ (Reichhold Inc), ARAKOTE™ (Ciba-Geigy Corporation), HETRON™ (Ashland Chemical), PARAPLEX™ (Rohm & Hass), POLYLITE™ (Reichhold Inc), PLASTHALL™ (Rohm & Hass), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation), XP777 (Reichhold Inc.), mixtures thereof, and the like. The polyester resin may also be a functionalized polyester, such as carboxylated, sulfonated, or the like. A sodio sulfonated polyester may be used.

Embodiments may include a crystalline polyester resin. As used herein, "crystalline" refers to a polymer with a three dimensional order. "Semicrystalline" as used herein refers to materials with a crystalline percentage of, for example, from about 10 to about 60 percent, and more specifically from about 12 to about 50 percent. Further, as used hereinafter "crystalline" encompasses both crystalline resins and semicrystalline materials, including saturated and unsaturated crystalline materials, unless otherwise specified. Alkali sulfonated polyester resins may be used.

Crystalline polyester resins may include, but are not limited to, alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly (propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-succinate), alkali copoly(5-sulfo-isophthaloyl)-copoly(propylene-succinate), alkali copoly(5-sulfo-isophthaloyl)-copoly(butylenes-succinate), alkali copoly(5-sulfo-isophthaloyl)-copoly(pentylene-succinate), alkali copoly(5-sulfo-isophthaloyl)-copoly(hexylene-succinate), alkali copoly(5-sulfo-isophthaloyl)-copoly(octylene-succinate), alkali copoly(5-sulfo-isophthaloyl)-copoly(ethylene-sebacate), alkali copoly(5-sulfo-isophthaloyl)-copoly (propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), and combination thereof, and wherein the alkali may be a metal such as sodium, lithium, or potassium.

Semicrystalline polyester resins may include, for example, poly(3-methyl-1-butene), poly(hexamethylene carbonate), poly(ethylene-p-carboxy phenoxy-butyrate), poly(ethylene-vinyl acetate), poly(docosyl acrylate), poly(dodecyl acrylate), poly(octadecyl acrylate), poly(octadecyl methacrylate), poly(behenylpolyethoxyethyl methacrylate), poly(ethylene adipate), poly(decamethylene adipate), poly(decamethylene azelaate), poly(hexamethylene oxalate), poly(decamethylene oxalate), poly(ethylene oxide), poly(propylene oxide), poly(butadiene oxide), poly(decamethylene oxide), poly(decamethylene sulfide), poly(decamethylene disulfide), poly(ethylene sebacate), poly(decamethylene sebacate), poly(ethylene suberate), poly(decamethylene succinate), poly(eicosamethylene malonate), poly(ethylene-p-carboxy phenoxy-undecanoate), poly(ethylene dithionesophthalate), poly(methyl ethylene terephthalate), poly(ethylene-p-carboxy phenoxy-valerate), poly(hexamethylene-4,4'-oxydibenzoate), poly(10-hydroxy capric acid), poly(isophthalaldehyde), poly(octamethylene dodecanedioate), poly(dimethyl siloxane), poly(dipropyl siloxane), poly(tetramethylene phenylene diacetate), poly(tetramethylene trithiodicarboxylate), poly(t-rimethylene dodecane dioate), poly(m-xylene), poly(p-xylylene pimelamide), and combinations thereof. The semicrystalline resins may have any suitable weight average molecular weight Mw, such as from about 7,000 to about 200,000, or from about 10,000 to about 150,000, or from about 15,000 to about 120,000; and any suitable number average molecular weight Mn, such as from about 1,000 to about 60,000, or from about 3,000 to about 50,000, or from about 5,000 to about 40,000.

The crystalline resin may possess a melting point of, for example, from about 30° C. to about 120° C., such as from about 50° C. to about 90° C., or from about 60° C. to about 80° C. The crystalline resin may have, for example, a number average molecular weight (Mn), as measured by gel permeation chromatography (GPC) of, for example, from about 1,000 to about 50,000, such as from about 2,000 to about 25,000, or from about 3,000 to about 20,000. The crystalline resin may have a weight average molecular weight (Mw) of the resin of, for example, from about 2,000 to about 100,000, such as from about 3,000 to about 80,000, or from about 4,000 to about 70,000, as determined by GPC using polystyrene standards. The molecular weight distribution (Mw/Mn) of the crystalline resin is, for example, from about 2 to about 6, such as from about 2 to about 4.

The crystalline resins may be prepared through polycondensation by reacting an organic diol and an organic diacid in the presence of a polycondensation catalyst. However, the crystalline polyester resin need not be made by such a method. A stoichiometric equimolar ratio of organic diol and organic diacid may be used, where the boiling point of the organic diol is from about 180° C. to about 230° C., an excess amount of diol may be utilized and removed during the polycondensation method. The amount of catalyst may vary, and may be selected in an amount, for example, of from about 0.01 to about 1 mole percent of the resin. Additionally, in place of an organic diacid, an organic diester can also be selected. Examples of suitable organic diols and organic diesters are described below.

Embodiments of the toner particle may include an amorphous polyester. Examples of amorphous polyesters suitable for use herein include amorphous polyester resins, branched amorphous polyester resins, and linear amorphous polyester resins.

Amorphous polyester resins may generally be prepared by the polycondensation of a diol, and a diacid or a diester.

Examples of diols suitable for the preparation of amorphous polyesters may include, but are not limited to, 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hyroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and mixtures thereof. The amount of organic diol may vary, and may be, for example, from about 45 to about 52 mole percent of the resin. However, less diol may be used in some embodiments where the polyester-wax resin is to be used to form toner particles by an emulsion aggregation method because, as described above, excess acid may be necessary.

Examples of diacids or diesters suitable for the preparation of amorphous polyesters may include, but are not limited to, dicarboxylic acids or diesters selected from terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The diacid or diester constitute, for example, from about 45 to about 52 mole percent of the resin.

Branched amorphous polyester resins may be prepared by the polycondensation of an organic diol, a diacid or diester, a multivalent polyacid or polyol as the branching agent and a polycondensation catalyst. Branching agents to generate branched amorphous polyester resins include, for example, multivalent polyacids such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl) methane, and 1,2,7,8-octanetetracarboxylic acid, acid anhydrides thereof, and lower alkyl esters thereof; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent may be selected in amounts from about 0.1 to about 5 mole percent of the resin.

Embodiments of the amorphous resins may possess, for example, a number average molecular weight (Mn), as measured by gel permeation chromatography (GPC), of from about 10,000 to about 500,000, such as from about 5,000 to about 250,000; or from about 7,000 to about 200,000. The amorphous resin may possess, for example, a weight average molecular weight (Mw) of, for example, from about 20,000 to about 600,000, and for example from about 7,000 to about 300,000, or from about 8,000 to about 200,000 as determined by GPC using polystyrene standards. The molecular weight distribution (Mw/Mn) of the amorphous resin may be, for example, from about 1.5 to about 6, such as from about 2 to about 5, or from about 2 to about 4.

Polyester-Wax Resin

As explained above, embodiments provide a unique method of chemically attaching a liquid bio-based oil to a polyester chain. The resulting polyester-wax resin includes a bio-based oil that is chemically incorporated into the main chain of the polyester resin, such as a pendent molecule. The method disclosed herein may include epoxidizing a vinyl functional group in a polyester resin, synthesizing amino derivatives of the bio-based oil, and covalently attaching the polyester resin to the amino derivatives of the bio-based oil.

The polyester resin of the polyester-wax resin may be formed from unsaturated monomers to provide the vinyl functional segment for epoxidation. Suitable unsaturated monomers may include, for example, a $C_2$ to $C_{20}$ unsaturated monomer, such as a $C_3$ to $C_{18}$ unsaturated monomer, or a $C_4$ to $C_{15}$ unsaturated monomer. The unsaturated monomers may include unsaturated diols and diacids. Suitable monoethylenically unsaturated di-acids are, for example, maleic acid, cyclohexene dicarboxylic acid, itaconic acid, mesaconic acid, fumaric acid, citraconic acid or their anhydrides. Suitable monoethylenically unsaturated diols are cis-2-butene-1,4-diol, and 2-butyn-1,4-diol, 1,4-butenediol, 1-propene-1,2-diol, 2-heptene-1,7-diol, 3-heptene-1,7-diol, 2-hexene-1,6-diol, 3-hexene-1,6-diol, 1-pentene-1,5-diol or 2-pentene-1,5-diol. A suitable unsaturated monoahydride may be maleic anhydride.

The epoxidation reaction may take place in any suitable solvent. The epoxidation reaction may be performed at a temperature of from about −20 to about 80° C. The reaction temperature may be, for example, about room temperature (about 20° C. to about 25° C.). The reaction time may be, for example, from about 5 minutes to about 72 hours, such as from about 10 hours to about 14 hours, or about 12 hours.

Various epoxidizing reagents may be used for epoxidizing the unsaturated units in the polyester backbone. Suitable epoxidizing agents may include, but are not limited to, epoxidizing agents containing a peroxide group, such as peracids, hydroperoxides, and other peroxides. The peracids may include, but are not limited to, for example, meta-chloroperoxybenzoic acid (MCPBA), peroxysulfuric acid, peroxyacetic acid, and peroxytrifluoroacetic acid. The hydroperoxides may include, by are not limited to, for example, hydrogen peroxide and tert-butyl hydroperoxide. Other peroxides may include, but are not limited to, for example, $O_2$ $O_3$, and magnesium monoperoxyphthalate hexahydrate (MMPP).

The reaction may yield from about 80% to over 90% polymer. The number-average molecular weight (Mn) and polydispersity index (PDI) of the polyester resin may change only slightly, or may remain completely unchanged, after the epoxidation. For example, little to no degradation of the polymer chain may be seen using this method. The polymer may be characterized by $^1$H NMR where the shift of the vinylic proton is easily seen from 5.7 to 3.1 ppm.

The following is an example of the epoxidation reaction:

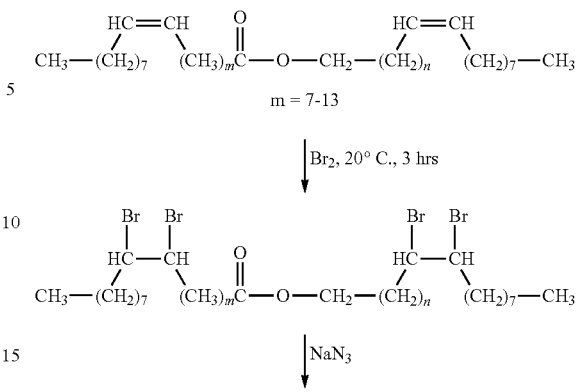

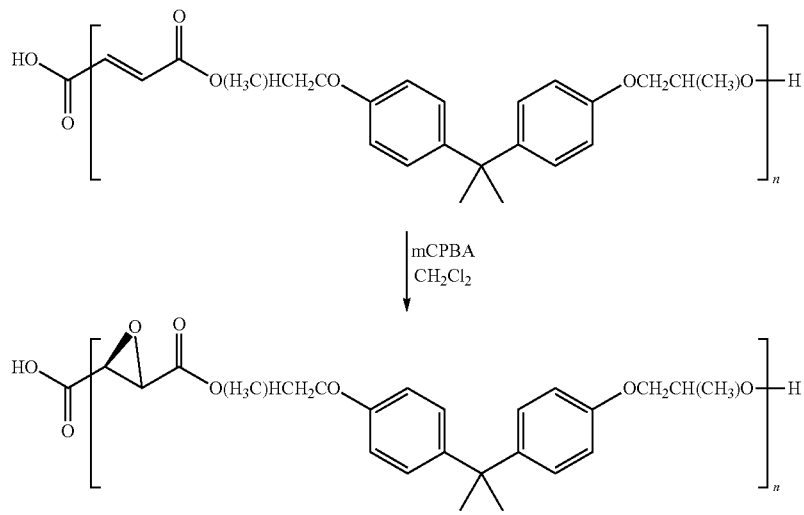

Binding a bio-based oil to a polyester resin may be achieved in different ways. In Shevachman, M., et al. "Chemical Binding of Jojoba Liquid Wax to Polyethylene." J. Am. Oil Chem. SOC. 2001, 78, 223-228, jojoba wax is bonded to polyethylene (PE) by two different methods. The first method involves binding allylic bromo derivatives of jojoba (J-xBr) to aminated PE (PE-SO$_2$NH$_2$). The second method involves binding allylic amino derivatives of jojoba (J-xNH$_2$) to chlorosulfonated PE (PE-SO$_2$Cl).

Allylic amino derivatives of the bio-based oil may be synthesized, for example, through the allylic bromo derivative (J-xBr) route disclosed in Shani, A., "Functionalization at the Double Bond Region of Jojoba Oil: 1. Bromine Derivatives." J. Am. Oil Chem. SOC. 1981, 845-850. Any halogen atom may be used to synthesize allylic amino derivatives of the bio-based oil. The method may begin with a substitution reaction of a halogen, such as bromine, to double bonds in the bio-based oil, followed by displacement of the halogen atoms by an azide ion. As disclosed in Avidon, V., et al., "Functionalization at the Double Bond Region of Jojoba Oil. 6. Production of Amines via Azides." J. Am. Oil Chem. SOC. 1994, 71, 993-997 ("Avidon"), another reaction may be the hydrogenation of the azides to diamine of the bio-based oil, as seen in an exemplary scheme below using jojoba oil as the bio-based oil.

In embodiments, the covalent attachment or binding of the polyester resin to the bio-based oil may occur through the reaction of the epoxide functional group on the unsaturated monomer within the polymer chain and the amine functionality of the bio-based oil. In embodiments, both an amorphous polyester resin, such as poly(propoxylated bisphenol-A co-fumarate) obtained from Reichold Chemicals, and a crystalline polyester may contain the required unsaturated monomer units for the epoxidation reaction.

The epoxidation reaction may take place before or within the phase inversion (PI) solvent system before emulsification is done, as described below. The bio-based oil may be chemically bound to the polyester after the solvent is removed via PT emulsification. In embodiments, the latex emulsion may be used in the EA toner method without the addition of a separate wax emulsion.

The following is an exemplary scheme for chemically bonding the bio-based oil to the polyester resin:

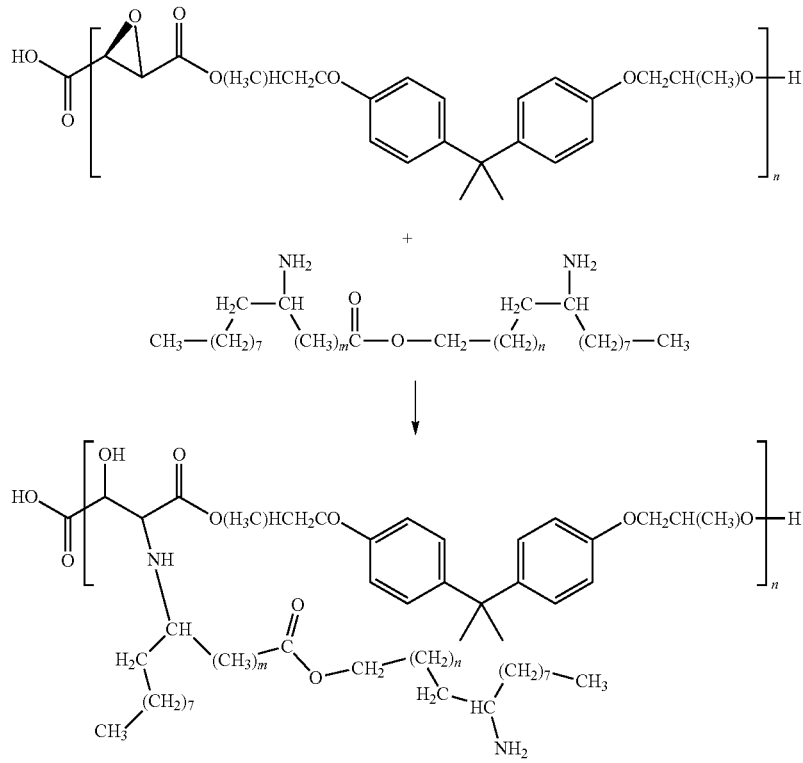

Crosslinking may occur if one of the NH$_2$ groups reacts with other functional groups on adjacent polymers.

The onset glass transition temperature (Tg) of the polyester-wax resin, and the resulting toner, may be from about 50° C. to about 70° C., such as from about 53° C. to about 67° C., or from about 56° C. to about 60° C. The softening temperature (Ts) of the polyester-wax resin, and the resulting toner, that is, the temperature at which the polyester-wax resin, and the resulting toner softens, may be from about 90° C. to about 135° C., such as from about 95° C. to about 130° C. or from about 105° C. to about 125° C.

Toner

The toner particle having the polyester-wax resin as described herein and may be made by any suitable method. Although embodiments relating to toner particle production are described below with respect to emulsion-aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety.

The toner particle, in embodiments, may also be prepared using methods such as conventional jetted toner particles. Conventional jetted toners are illustrated in a number of patents, such as U.S. Pat. Nos. 6,177,221, 6,319,647, 6,365,316, 6,416,916, 5,510,220, 5,227,460, 4,558,108, and 3,590,000, each of which is incorporated herein by reference in its entirety. Conventional jetted toners may comprise materials described in the aforementioned references. As these references fully describe conventional jetted toners made by processes other than the EA process and methods of making the same, further discussion on these points is omitted herein.

Emulsion Aggregation

As discussed above, the toner particles having the polyester-wax resin as described herein may be made by the emulsion aggregation method.

An example of a method for generating a resin emulsion for the production of toner particles having the polyester-wax resin is disclosed in U.S. Pat. No. 7,029,817, which is incorporated herein in its entirety by reference. Emulsion aggregation toner dispersions may be generated by other methods including, but not limited to, the melt mixing method disclosed in U.S. patent application Ser. No. 11/094,413, which is incorporated herein in its entirety by reference, and the phase inversion method.

The polyester toner particles may be created by the emulsion aggregation (EA) method, which are illustrated in a number of patents, such as U.S. Pat. No. 5,593,807, U.S. Pat. No. 5,290,654, U.S. Pat. No. 5,308,734, and U.S. Pat. No. 5,370,963, each of which are incorporated herein by reference in their entireties. The polyester resin of the polyester-wax resin may comprise any of the polyester materials described in the aforementioned references.

In embodiments, toner compositions may be prepared by any known emulsion-aggregation method. As described below, a method may include aggregating a mixture of additives and the emulsion comprising a polyester-wax resin as disclosed herein, and then coalescing the aggregated mixture.

Polyester-Wax Resin Emulsion

The polyester-wax resin emulsion may be prepared by dissolving the resin in a suitable solvent. In embodiments, the resin emulsion may be prepared by dissolving a polyester-wax resin in a solvent. Crystalline polyester emulsions may be similarly prepared.

Suitable solvents include alcohols, ketones, esters, ethers, chlorinated solvents, nitrogen containing solvents and mixtures thereof. Specific examples of suitable solvents include acetone, methyl acetate, methyl ethyl ketone, tetrahydrofuran, cyclohexanone, ethyl acetate, N,N dimethylformamide, dioctyl phthalate, toluene, xylene, benzene, dimethylsulfoxide, mixtures thereof, and the like. The resin may be dissolved in the solvent at elevated temperature of from about 40° C. to about 80° C., such as from about 50° C. to about 70° C. or from about 60° C. to about 65° C. The dissolution temperature may be lower than the glass transition temperature of the wax and resin. In embodiments, the resin is dissolved in the solvent at an elevated temperature, but below the boiling point of the solvent, such as from about 2° C. to about 15° C. below the boiling point of the solvent, such as from about 3° C. to about 13° C. below the boiling point of the solvent, or from about 5° C. to about 10° C. below the boiling point of the solvent.

The resin may be dissolved in the solvent, and mixed into an emulsion medium, for example water, such as deionized water optionally containing a stabilizer and a surfactant. Examples of suitable stabilizers include water-soluble alkali metal hydroxides, such as sodium hydroxide, potassium hydroxide, lithium hydroxide, beryllium hydroxide, magnesium hydroxide, calcium hydroxide, or barium hydroxide; ammonium hydroxide; alkali metal carbonates, such as sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate; or mixtures thereof. In embodiments, the stabilizer is sodium bicarbonate or ammonium hydroxide. When the stabilizer is used in the composition, it is typically present in amounts of from about 0.1 percent to about 5 percent, such as from about 0.5 percent to about 3 percent, by weight of the resin. When such salts are added to the composition as a stabilizer, in embodiments, incompatible metal salts are not present in the composition. For example, when these salts are used, the composition should be completely or essentially free of zinc and other incompatible metal ions, for example, Ca, Fe, Ba, etc., that form water-insoluble salts. The term "essentially free" refers, for example, to the incompatible metal ions present at a level of less than about 0.01 percent, such as less than about 0.005 percent or less than about 0.001 percent, by weight of the wax and resin. The stabilizer may be added to the mixture at ambient temperature, or it may be heated to the mixture temperature prior to addition.

Optionally, an additional stabilizer, such as a surfactant, may be added to the aqueous emulsion medium to afford additional stabilization to the resin. Suitable surfactants include anionic, cationic and nonionic surfactants. In embodiments, the use of anionic and nonionic surfactants may help stabilize the aggregation method in the presence of the coagulant, which otherwise could lead to aggregation instability.

Anionic surfactants include sodium dodecylsulfate (SDS), sodium dodecyl benzene sulfonate, sodium dodecylnaphthalene sulfate, dialkyl benzenealkyl, sulfates and sulfonates, abitic acid, and the NEOGEN brand of anionic surfactants. An example of a suitable anionic surfactant is NEOGEN R-K available from Daiichi Kogyo Seiyaku Co. Ltd. (Japan), or TAYCAPOWER BN2060 from Tayca Corporation (Japan), which consists primarily of branched sodium dodecyl benzene sulfonate.

Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride), available from Kao Chemicals, and the like. An example of a suitable cationic surfactant is SANISOL B-50 available from Kao Corporation, which consists primarily of benzyl dimethyl alkonium chloride.

Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Inc. as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897. An example of a suitable nonionic surfactant is ANTAROX 897 available from Rhone-Poulenc Inc., which consists primarily of alkyl phenol ethoxylate.

After the stabilizer or stabilizers are added, the resultant mixture may be mixed or homogenized for any amount of time.

Next, the mixture is heated to flash off the solvent, and then cooled to room temperature (about 20° C. to about 25° C.). For example, the solvent flashing may be conducted at any suitable temperature above the boiling point of the solvent that will flash off the solvent, such as a temperature of from about 60° C. to about 100° C., such as from about 70° C. to about 90° C. or about 80° C., although the temperature may be adjusted based on, for example, the particular wax, resin, and solvent used.

Following the solvent flash step, the polyester-wax resin emulsion, may have an average particle diameter in the range of from about 100 to about 500 nanometers, such as from about 130 to about 300 nanometers as measured with a Honeywell MICROTRAC® UPA150 particle size analyzer.

In alternative embodiments, the polyester-wax resin emulsion may be prepared by a suitable method, such as, solvent flash or phase inversion emulsification and the like.

A pre-toner mixture is prepared by combining the colorant, and optionally other materials, such as a surfactant, and the polyester-wax resin emulsion. In embodiments, the pH of the pre-toner mixture is adjusted to from about 2.5 to about 4. The pH of the pre-toner mixture may be adjusted by an acid such as, for example, acetic acid, nitric acid or the like. Additionally, in embodiments, the pre-toner mixture optionally may be homogenized. If the pre-toner mixture is homogenized, homogenization may be accomplished by mixing at from about 600 to about 4,000 revolutions per minute. Homogenization may be accomplished by any suitable means, including, for example, an IKA ULTRA TURRAX T50 probe homogenizer.

Aggregation

Any suitable aggregating agent may be utilized to form a toner particle using the above pre-toner mixture. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

In embodiments, the aggregating agent may be added to the mixture utilized to form a toner in an amount of, for example, from about 0.01% to about 8% by weight, in embodiments from about 0.1% to about 1% by weight, in other embodiments from about 0.15% to about 0.8% by weight, of the resin in the mixture, although amounts outside these ranges may be utilized. This may provide a sufficient amount of agent for aggregation.

To control aggregation and subsequent coalescence of the particles, in embodiments the aggregating agent may be metered into the mixture over time. For example, the agent may be metered into the mixture over a period of from about 5 to about 240 minutes, in embodiments from about 30 to about 200 minutes, although more or less time may be used. The addition of the agent may occur while the mixture is maintained under stirred conditions, in embodiments from about 50 rpm to about 1,000 rpm, in other embodiments from about 100 rpm to about 500 rpm, although speeds outside these ranges may be utilized. The addition of the agent may also occur while the mixture is maintained at a temperature that is below the glass transition temperature of the resin discussed above, in embodiments from about 30° C. to about 90° C., in embodiments from about 35° C. to about 70° C., although temperatures outside these ranges may be utilized.

The particles may be permitted to aggregate until a predetermined particle size is obtained. A predetermined size refers to the particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 30° C. to about 99° C., and holding the mixture at this temperature for a time from about 0.5 hours to about 10 hours, in embodiments from about hour 1 to about 5 hours (although times outside these ranges may be utilized), while maintaining stirring, to provide the aggregated particles. Once the predetermined particle size is reached, the growth process is halted. In embodiments, the predetermined particle size may be the size of the final toner particles.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C. (although temperatures outside these ranges may be utilized), which may be below the glass transition temperature of the resin as discussed above.

Once the final size of the toner particles is achieved, the pH of the mixture may be adjusted with a base to a value of from about 3 to about 10, and in embodiments from about 5 to about 9, although a pH outside these ranges may be utilized. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the values noted above.

Core-Shell Structure

The toner particles derived from the polyester-wax resin described herein may have a core-shell structure. The toner core may comprise a high molecular weight amorphous resin, a low molecular weight amorphous resin, and a crystalline polyester resin with a bio-based oil, such as, for example, jojoba oil chemically bonded to its backbone. The shell may comprise a high molecular weight amorphous resin and a lower molecular weight amorphous resin. The shell may only comprise amorphous resin.

In embodiments, after aggregation, but prior to coalescence, a resin coating may be applied to the aggregated particles to form a shell thereover. Any resin described above as suitable for forming the toner resin may be utilized as the shell.

In embodiments, resins which may be utilized to form a shell include, but are not limited to, crystalline polyesters described above, and/or the amorphous resins described above for use as the core. For example, in embodiments, a polyalkoxylated bisphenol A-co-terephthalic acid/dodecenylsuccinic acid/trimellitic acid resin, a polyalkoxylated bisphenol A-co-terephthalic acid/fumaric acid/dodecenylsuccinic acid resin, or a combination thereof, may be combined with a polydodecanedioic acid-co-1,9-nonanediol crystalline polyester resin to form a shell. Multiple resins may be utilized in any suitable amounts.

The shell resin may be applied to the aggregated particles by any method within the purview of those skilled in the art. In embodiments, the resins utilized to form the shell may be in an emulsion including any surfactant described above. The emulsion possessing the resins may be combined with the aggregated particles described above so that the shell forms over the aggregated particles. In embodiments, the shell may have a thickness of up to about 5 microns, in embodiments of from about 0.1 to about 2 microns, in other embodiments, from about 0.3 to about 0.8 microns, over the formed aggregates, although thicknesses outside of these ranges may be obtained.

The formation of the shell over the aggregated particles may occur while heating to a temperature of from about 30° C. to about 80° C. in embodiments from about 35° C. to about 70° C., although temperatures outside of these ranges may be utilized. The formation of the shell may take place for a period of time of from about 5 minutes to about 10 hours, in embodiments from about 10 minutes to about 5 hours, although times outside these ranges may be used.

For example, in some embodiments, the toner process may include forming a toner particle by mixing the polymer latexes, in the presence of a wax dispersion and the surface-treated pigment of this disclosure, including, for example, the surface-treated titanium dioxide described above, with an optional coagulant while blending at high speeds. The resulting mixture having a pH of, for example, of from about 2 to about 3, is aggregated by heating to a temperature below the polymer resin Tg to provide toner size aggregates. Optionally, additional latex can be added to the formed aggregates providing a shell over the formed aggregates. The pH of the mixture may then be changed, for example by the addition of a sodium hydroxide solution, until a pH of about 7 may be achieved.

Coalescence

Following aggregation to a particle size and application of any optional shell, the particles may then be coalesced to the final shape, the coalescence being achieved by, for example, heating the mixture to a temperature of from about 45° C. to about 100° C., in embodiments from about 55° C. to about 99° C. (although temperatures outside of these ranges may be used), which may be at or above the glass transition temperature of the resins utilized to form the toner particles, and/or reducing the stirring, for example to from about 100 rpm to about 1,000 rpm, in embodiments from about 200 rpm to about 800 rpm (although speeds outside of these ranges may be used). The fused particles can be measured for shape factor or circularity, such as with a Sysmex FPIA 2100 analyzer, until a shape is achieved.

Higher or lower temperatures may be used, it being understood that the temperature is a function of the resins used for the binder. Coalescence may be accomplished over a period of from about 0.01 hours to about 9 hours, in embodiments from about 0.1 hours to about 4 hours (although times outside of these ranges may be used).

After aggregation and/or coalescence, the mixture may be cooled to room temperature, such as from about 20° C. to about 25° C. The cooling may be rapid or slow. A suitable cooling method may include introducing cold water to a jacket around the reactor. After cooling, the toner particles may be optionally washed with water, and then dried. Drying may be accomplished by any suitable method for drying including, for example, freeze-drying.

Other Components and Additives

In embodiments, the method may include the use of surfactants, emulsifiers, and other additives, such as those discussed above. Likewise, various modifications of the above method will be apparent and are encompassed herein.

The toner particles described herein may further include other components, such as colorants, and various external additives. Colorant includes pigments, dyes, mixtures of dyes, mixtures of pigments, mixtures of dyes and pigments, and the like.

When present, the colorant may be added in an effective amount of, for example, from about 1 to about 25 percent by weight of the particle, such as from about 2 to about 12 weight percent. Suitable example colorants include, for example, carbon black like REGAL 330® magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX8600™, 8610™; Northern Pigments magnetites, NP-604™, NP-608™; Magnox magnetites TMB-100™, or TMB-104™; and the like. As colored pigments, there may be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that may be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants may be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF).

In embodiments, the toner particles may be curable upon exposure to UV radiation, for example, where the polyester resin of the polyester-wax resin includes unsaturated moieties as described above. In such embodiments, the toner may further include suitable photoinitiators, such as UV-photoinitiators including, but not limited to, hydroxycyclohexylphenyl ketones; other ketones such as alpha-amino ketone and 4-(2-hydroxyethoxy)phenyl-(2-hydroxy-2-propyl) ketone; benzoins; benzoin alkyl ethers; benzophenones, such as 2,4, 6-trimethylbenzophenone and 4-methylbenzophenone; trimethylbenzoylphenylphosphine oxides such as 2,4,6-trimethylbenzoyl-diphenyl-phosphine oxide or phenylbis(2,4,6-trimethylvbenzyoyl) phosphine oxide (BAPO) available as IRGACURE 819 from Ciba; azo compounds; anthraquinones and substituted anthraquinones, such as, for example, alkyl substituted or halo substituted anthraquinones; other substituted or unsubstituted polynuclear quinines; acetophenones, thioxanthones; ketals; acylphosphines; and mixtures thereof. Other examples of photoinitiators include, but not limited to, 2-hydroxy-2-methyl-1-phenyl-propan-1-one and 2-isopropyl-9H-thioxanthen-9-one. In embodiments, the photoinitiator is one of the following compounds or a mixture thereof: a hydroxycyclohexylphenyl ketone, such as, for example, 2-hydroxy-4'-hydroxyethoxy-2-methylpropiophenone or 1-hydroxycyclohexylphenyl ketone, such as, for example, IRGACURE® 184 (Ciba-Geigy Corp., Tarrytown, N.Y.), having the structure:

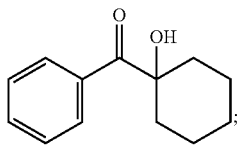 [SMILES: O=C(c1ccccc1)C1(O)CCCCC1]

a trimethylbenzoylphenylphosphine oxide, such as, for example, ethyl-2,4,6-trimethylbenzoylphenylphosphinate, such as, for example, LUCIRIN® TPO-L (BASF Corp.), having the formula

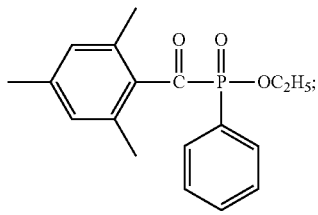 [SMILES: CCOP(=O)(C(=O)c1c(C)cc(C)cc1C)c1ccccc1]

a mixture of 2,4,6-trimethylbenzophenone and 4-methylbenzophenone, such as, for example, SARCURE™ SR1137 (Sartomer); a mixture of 2,4,6-trimethylbenzoyl-diphenylphosphine oxide and 2-hydroxy-2-methyl-1-phenyl-propan-1-one, such as, for example, DAROCUR® 4265 (Ciba Specialty Chemicals); alpha-amino ketone, such as, for example, IRGACURE® 379 (Ciba Specialty Chemicals); 4-(2-hydroxyethoxy)phenyl-(2-hydroxy-2-propyl) ketone, such as, for example, IRGACURE® 2959 (Ciba Specialty Chemicals); 2-isopropyl-9H-thioxanthen-9-one, such as, for example, DAROCUR® ITX (Ciba Specialty Chemicals); and mixtures thereof.

The toner composition may contain from about 0.5 to about 15 wt % photoinitiator, such as from about 1 to about 15 wt %, or from about 3 to about 12 wt %. The photoinitiator may be a UV-photoinitiator. Of course, other amounts may be used.

The toner may also include any suitable surface additives. Examples of surface additives are surface treated fumed silicas, for example TS-530 from Cabosil Corporation, with an 8 nanometer particle size and a surface treatment of hexamethyldisilazane; NAX50 silica, obtained from DeGussa/Nippon Aerosil Corporation, coated with HMDS; DTMS silica, obtained from Cabot Corporation, comprised of a fumed silica silicon dioxide core L90 coated with DTMS; H2050EP, obtained from Wacker Chemie, coated with an amino functionalized organopolysiloxane; metal oxides such as $TiO_2$, for example MT-3103 from Tayca Corp. with a 16 nanometer particle size and a surface treatment of decylsilane; SMT5103, obtained from Tayca Corporation, comprised of a crystalline titanium dioxide core MT500B coated with DTMS (decyltrimethoxysilane); P-25 from Degussa Chemicals with no surface treatment; alternate metal oxides such as aluminum oxide, and as a lubricating agent, for example, stearates or long chain alcohols, such as UNILIN 700™, and the like. In general, silica is applied to the toner surface for toner flow, tribo enhancement, admix control, improved development and transfer stability, and higher toner blocking temperature. $TiO_2$ is applied for improved relative humidity (RH) stability, tribo control and improved development and transfer stability. Examples of suitable $SiO_2$ and $TiO_2$ are those surface treated with compounds including DTMS (decyltrimethoxysilane) or HMDS (hexamethyldisilazane).

The $SiO_2$ and $TiO_2$ may generally possess a primary particle size greater than approximately 30 nanometers, or at least 40 nanometers, with the primary particles size measured by, for instance, transmission electron microscopy (TEM) or calculated (assuming spherical particles) from a measurement of the gas absorption, or BET, surface area. $TiO_2$ is found to be especially helpful in maintaining development and transfer over a broad range of area coverage and job run length. The $SiO_2$ and $TiO_2$ are more specifically applied to the toner surface with the total coverage of the toner ranging from, for example, about 140 to about 200 percent theoretical surface area coverage (SAC), where the theoretical SAC (hereafter referred to as SAC) is calculated assuming all toner particles are spherical and have a diameter equal to the volume median diameter of the toner as measured in the standard Coulter Counter method, and that the additive particles are distributed as primary particles on the toner surface in a hexagonal closed packed structure. Another metric relating to the amount and size of the additives is the sum of the "SAC× Size" (surface area coverage times the primary particle size of the additive in nanometers) for each of the silica and titania particles, or the like, for which all of the additives should, more specifically, have a total SAC×Size range of, for example, about 4,500 to about 7,200. The ratio of the silica to titania particles is generally from about 50 percent silica/50 percent titania to about 85 percent silica/15 percent titania (on a weight percentage basis).

Calcium stearate and zinc stearate may be selected as an additive for embodiments of the toner. The calcium and zinc stearate primarily provide lubricating properties. Also, the calcium and zinc stearate can provide developer conductivity and tribo enhancement, both due to its lubricating nature. In addition, calcium and zinc stearate enables higher toner charge and charge stability by increasing the number of contacts between toner and carrier particles. A suitable example is a commercially available calcium and zinc stearate with greater than about 85 percent purity, for example from about 85 to about 100 percent pure, for the 85 percent (less than 12 percent calcium oxide and free fatty acid by weight, and less than 3 percent moisture content by weight) and which has an average particle diameter of about 7 microns and is available from Ferro Corporation (Cleveland, Ohio). Examples are SYNPRO® Calcium Stearate 392A and SYNPRO® Calcium Stearate NF Vegetable or Zinc Stearate-L. Another example is a commercially available calcium stearate with greater than 95 percent purity (less than 0.5 percent calcium oxide and free fatty acid by weight, and less than 4.5 percent moisture content by weight), and which stearate has an average particle diameter of about 2 microns and is available from NOF Corporation (Tokyo, Japan). In embodiments, the toners contain from, for example, about 0.1 to about 5 weight percent titania, about 0.1 to about 8 weight percent silica, or from about 0.1 to about 4 weight percent calcium or zinc stearate.

Toner Properties

In embodiments, the charge distribution for the toner particles in both the A-zone and the C-zone may be from about −2 mm to about −25 mm displacement, such as from about −4 mm to about −20 mm displacement.

The charge performance or distribution of a toner is frequently demarcated as q/d (mm). The toner charge (q/d) is measured as the midpoint of the toner charge distribution. The charge is reported in millimeters of displacement from the zero line in a charge spectrograph using an applied transverse electric field of 100 volts per cm. The q/d measure in mm may be converted to a value in fC/µm by multiplying the value in mm by 0.092.

In embodiments, the ratio of the charge distribution in the A-zone to the C-zone may be as close to 1 as possible. This ratio (C-zone/A-zone) is frequently referred to as the relative humidity (RH) sensitivity by those skilled in the art. In embodiments, the RH sensitivity may be in a range of less than about 10, such as from about 0.03 to about 8.

The toner particles described herein also exhibit acceptable toner cohesion. Toner cohesion may be measured using a Hosokawa Micron PT-R tester, available from Micron Powders Systems. Toner cohesion is typically expressed in percent (%) cohesion. Percent cohesion may be measured by placing a known mass of toner, for example 2 grams, on top of a set of stacked screens, for example a top screen that has 53 micron mesh or openings, a middle screen that has 45 micron mesh or openings, and a bottom screen that has 38 micron mesh or openings, and vibrating the screens and toner for a fixed time at a fixed vibration amplitude, for example for 90 seconds at 1 millimeter vibration amplitude. All screens are made of stainless steel. The percent cohesion is then calculated as follows:

$$\% \text{ cohesion} = 50 \cdot A + 30 \cdot B + 10 \cdot C$$

where A is the mass of toner remaining on the 53 micron screen, B is the mass of toner remaining on the 45 micron screen, and C is the mass of toner remaining on the 38 micron screen. The percent cohesion of the toner is related to the amount of toner remaining on each of the screens at the end of the time. A percent cohesion value of 100% corresponds to all the toner remaining on the top screen at the end of the vibration step and a percent cohesion of 0% corresponds to all of the toner passing through all three screens, in other words, no toner remaining on any of the three screens at the end of the vibration step. The greater the percent cohesion for toners, the less the toner particles are able to flow. In embodiments, the toners may have a percent cohesion in the range of, for example, from about 30% to about 80%, such as from about 35% to about 75%, or from about 40% to about 65%.

Developer

The toner particles of all embodiments may be included in developer compositions. In embodiments, developer compositions comprise single component developers of toner only, and two component developers of toner particles mixed with carrier particles. In some embodiments, the toner concentration in the developer composition may range from about 1 weight percent to about 25 weight percent, such as from about 2 weight percent to about 15 weight percent, of the total weight of the developer composition.

Examples of carrier particles suitable for mixing with the toner include those particles that are capable of triboelectrically obtaining a charge of opposite polarity to that of the toner particles, such as granular zircon, granular silicon, glass, steel, nickel, ferrites, iron ferrites, silicon dioxide, and the like.

The selected carrier particles may be used with or without a coating, the coating generally being comprised of fluoropolymers, such as polyvinylidene fluoride resins; terpolymers of styrene; methyl methacrylate; silanes, such as triethoxy silane; tetrafluoroethylenes; other known coatings; and the like.

Imaging

In embodiments, any known type of image development system may be used in an image developing device, including, for example, magnetic brush development, jumping single-component development, hybrid scavengeless development (HSD), etc. These development systems are known in the art, and further explanation of the operation of these devices to form an image is thus not necessary herein. Once the image is formed with toners/developers described herein via a suitable image development method such as any one of the aforementioned methods, the image is then transferred to an image receiving medium such as paper and the like. In an embodiment described herein, the toners may be used in developing an image in an image-developing device utilizing a fixing member, such as a fuser roll member. The fixing member suitable for use with the toner having a polyester-wax resin as described herein may be an oil-less fixing member or a low oil fixing member. As used herein and "oil-less fixing member" refers to a fixing member that is utilized with no oil. As used herein a "low oil fixing member" refers to a fixing member, or fuser, that use from about 0.5 µL of oil per print/copy to about 1 µL of oil per print/copy. In contrast, fixing members that are not oil-less and not low oil fixing members are usual used with from about 5 µL of oil per print/copy to about 10 µL of oil per print/copy.

A toner having the polyester-wax resin described herein is particularly suitable for use with an oil-less fixing member or a low oil fixing member because the wax is present in the toner without any preparation disadvantages as described herein. Fuser roll members are contact fusing devices that are known in the art, in which heat and pressure from the roll are used in order to fuse the toner to the image-receiving medium. Typically, the fuser member may be heated to a temperature just above the fusing temperature of the toner, that is, to temperatures of from about 80° C. to about 150° C. or more.

Embodiments described above will now be further illustrated by way of the following examples, which are not intended to limit the disclosure.

EXAMPLES

Preparation of Crystalline Resin Emulsion Including a Crystalline Polyester Resin, Copoly(Ethylene-Dodecanoate)-Copoly-(Ethylene-Fumarate), Derived from Dodecanedioic Acid, Ethylene Glycol and Fumaric Acid A one liter Parr reactor equipped with a heating mantle, mechanical stirrer, bottom drain valve and distillation apparatus was charged with dodecanedioic acid (about 443.6 grams), fumaric acid (about 18.6 grams), hydroquinone (about 0.2 grams), n-butylstannoic acid (FASCAT 4100) catalyst (about 0.7 grams), and ethylene glycol (about 248 grams). The materials were stirred and slowly heated to about 150° C. over about 1 hour under a stream of $CO_2$. The temperature was then increased by about 15° C., and subsequently about 10° C. intervals, every 30 minutes, to about 180° C.

During this time, water was distilled as a byproduct. The temperature was then increased by about 5° C. intervals over about a 1 hour period to about 195° C. The pressure was then reduced to about 0.03 mbar over about a 2 hour period and any excess glycols were collected in the distillation receiver. The resin was returned to atmospheric pressure under a stream of $CO_2$ and then trimellitic anhydride (about 12.3 grams) was added. The pressure was slowly reduced to about 0.03 mbar over about 10 minutes and held there for about another 40 minutes. The crystalline resin, copoly(ethylene-dodecanoate)-copoly-(ethylene-fumarate, was returned to atmospheric pressure and then drained through the bottom drain valve to give a resin with a viscosity of about 87 Pas (measured at about 85° C.), an onset melting of about 69° C., a melt point temperature peak of about 78° C., and a recrystallization peak on cooling of about 56° C., as measured by the Dupont Differential Scanning calorimeter. The acid value of the resin was found to be about 12 meq/KOH.

Epoxidation of the Vinyl Functional Group in the Polyester Resin Backbone

About 150 grams of copoly(Ethylene-Dodecanoate)-Co-poly-(Ethylene-Fumarate) was dissolved in about 2.5 liters of dichloromethane to which about 205 grams of cold meta-chloroperbenzoic acid (mCPBA, 77% grade, obtained from Sigma-Aldrich) was added. The reaction mixture was stirred overnight, for a period of time from about 12 hours to about 24 hours, at room temperature (about 20° C. to about 25° C.), and then filtered to remove any insoluble material. The filtrate was concentrated under reduced pressure of about 50 torr and then added to slowly stirring methanol at about 300 revolutions per minute (rpm) to induce precipitation. The resulting white, fibrous material was collected by filtration and dried. $^1$H NMR spectroscopy showed the absence of a 5.3 ppm signal corresponding to alkene protons and the presence of a new signal at 2.4 ppm, corresponding to epoxide ring protons Functionalization of Jojoba Oil with Bromine To a solution of 236 g of jojoba oil (0.4 mol) in 1 liter of $CCl_2$, a solution of 128 g $Br_2$ (0.8 mol) in 200 ml $CCl_2$ was added dropwise over a period of 6 hours. The reaction mixture was kept at 17-20° C. by a cold water bath during this time. The reaction mixture was almost colourless during the addition. Any unreacted bromine was washed away with $Na_2SO_3$ solution during work up.

Synthesis of Vinylic Jojoba Diazide

A solution of 233.2 g (0.256 mol) of brominated jojoba oil in 1 liter of DMF with 72 g (1.12 mol) of activated $NaN_3$ (sodium azide) was stirred for 6 hours at 90-94° C. in an oil bath. The crude product yield was 174.8 g after standard workup. After purification, the yield of the final light yellow oil was 140.0 g.

Synthesis of Diaminojojoba from Vinylic Jojoba Diazide

A mixture of 138.6 g (0.167 mol) of diazided jojoba oil in 2.4 liters ethanol with 15.75 g of 10% Pd/C (palladium on carbon, 10 wt. % loading, matrix activated carbon support from Aldrich) was hydrogenated with $H_2$ for 24 hours at room temperature (about 20° C. to about 25° C.) (and under pressure, 63 psi). This form of Pd/C is used for catalysis, mainly hydrogenations at described here. The metal (Pd) is distributed over finely divided carbon making the surface area larger so that catalyst is more reactive. The catalyst was filtered off, and the solvent was evaporated off under vacuum to give 130.5 g of crude dihydrobromide of jojoba diamine. The yield of pure product was 114.8 g (88%). The jojoba diamine (base) was obtained from the dihydrobromide by standard workup. The product was a white wax with a melting point of 40-45° C. The final yield was 91.8 g (80%).

Reaction of Diaminojojoba with Epoxided Crystalline Resin in Phase Inversion Solvents followed by PIE The coupling of the amine functionalized jojoba (diaminojojoba) to the epoxidized polyester resin may be done directly in the Methyl Ethyl Ketone (MEK) and Isopropyl Alcohol (IPA) solvent mixture under inert atmosphere (nitrogen gas). About 150 grams of an epoxided crystalline polyester resin, 52.5 grams of Methyl Ethyl Ketone (MEK), 43.5 grams of Isopropyl alcohol (IPA) and 90 grams of diaminated jojoba oil was charged into a 1 liter glass reaction vessel. The mixture was stirred at about 80 rpm and heated to about 76° C. to substantially dissolve the resin in the solvent mixture and left to react for 24 hours under a blanket of nitrogen. After 24 hours, 4.53 grams of 10 wt % ammonium hydroxide is added to the reaction vessel and the rpm is increased to about 100 rpm. To this vessel was added 300 grams of hot DI water (96° C.—heated through coiled tube) at a rate of about 4.4 g/min. Then, another 150 grams of DI water is added at a rate of about 10 g/min. Once completed the mixture was cooled to room temperature (about 20° C. to about 25° C.) and screened through a 20 micron sieve. The resulting resin emulsion was comprised of about 30% solids by weight and had a volume average diameter of about 150 nanometers as measured with the NANOTRAC® particle size analyzer.

Synthesis of Toner Containing Chemically Bonded Jojoba Oil to Crystalline Polyester A cyan polyester EA toner was prepared in a 2 L reactor (134.36 grams dry theoretical toner); 137.1 grams amorphous emulsion (low molecular weight resin 23.3 wt % solids), 200.6 grams of the amorphous emulsion (high molecular weight resin; 16.0 wt % solids)—which is a 50:50 ratio of a high and low molecular weight resin, 35.14 grams of the jojoba bound crystalline emulsion (crystalline polyester; 26 wt % solids), 1.01 grams Dowfax 2A1 surfactant and 58.2 grams of the Pigment Cyan 15:3 Dispersion were mixed together. While homogenizing the mixture at 3000-4000 rpm an aluminum sulphate solution, consisting of 2.96 grams aluminum sulphate with 36.6 grams of DI water was added over 20 minute period. The slurry was then transferred to a 2 L Buchi where the temperature was heated to begin aggregating at a batch temperature of 43° C.

During aggregation, particle size measurements are taken and run in a Multisizer Coulter counter. Once at the targeted particle size a shell comprised of the same amorphous emulsions in the core was added to the reactor and the reactor is further heated to achieve the final targeted particle size. The slurry was then pH adjusted using sodium hydroxide (NaOH) and Versene-100 and the aggregation step was frozen at a pH of about 7.8. The method proceeds with the reactor temperature (Tr) being increased to 85° C. while maintaining a pH≥7.5 until Tr is 80 deg C. Once at 85° C. the pH of the toner slurry is adjusted to pH 7 with a pH 5.7 Buffer. At which time the toner slurry is held to coalesce the particles until they achieve the target circularity of ≥0.970 (about 40 minutes). Once coalesced, the toner slurry was quench cooled. The final toner particle D50/GSDv/GSDn and circularity were about 5.85/1.21/1.22 and 0978, respectively. The amount of CPE-bound jojoba oil in the particle is calculated to be 6.8-wt %, of which 4.1% is the bound jojoba oil.

It will be appreciated that various of the above-disclosed and other features and functions, or alternatives thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. An emulsion aggregation toner particle comprising:
   a bio-based oil chemically bonded to a polyester resin; and
   a colorant.
2. The emulsion aggregation toner particle according to claim 1, wherein the bio-based oil is a partially hydrogenated jojoba oil.

3. The emulsion aggregation toner particle according to claim 1, wherein the toner particle has a core-shell structure, wherein
the core comprises a high molecular weight amorphous resin, a low molecular weight amorphous resin, and the bio-based oil chemically bonded to a polyester resin; and
the shell comprises a high molecular weight amorphous resin and a lower molecular weight amorphous resin.

4. A polyester-wax resin emulsion comprising a bio-based oil chemically bonded to a polyester resin.

5. The emulsion aggregation toner particle according to claim 1, wherein the bio-based oil chemically bonded to a polyester resin is formed by a method comprising:
epoxidizing unsaturated units of a polyester resin;
synthesizing an amino-functionalized bio-based oil from a bio-based oil; and
chemically bonding the amino-functionalized bio-based oil to the epoxidized units of the polyester resin.

6. The emulsion aggregation toner particle according to claim 5, wherein the method does not comprise a step of providing a second or separate wax emulsion.

7. The emulsion aggregation toner particle according to claim 1, wherein the bio-based oil is selected from the group consisting of a partially hydrogenated oil extracted from a plant, a non-hydrogenated vegetable oil extracted from a plant, and mixtures thereof.

8. The emulsion aggregation toner particle according to claim 7, wherein the bio-based oil is a partially hydrogenated oil extracted from a plant.

9. The emulsion aggregation toner particle according to claim 5, wherein the amino-functionalized bio-based oil is a diamino compound synthesized by a method comprising:
functionalizing the bio-based oil with halogen atoms;
forming a diazide from the halogen-functionalized bio-based oil; and
hydrogenating the diazide.

10. The emulsion aggregation toner particle according to claim 5, wherein an epoxidizing agent containing a peroxide group is used to epoxidize the unsaturated units of the polyester resin.

11. The emulsion aggregation toner particle according to claim 10, wherein the epoxidizing agent is a member selected from the group consisting of meta-chloroperoxybenzoic acid (MCPBA), peroxysulfuric acid, peroxyacetic acid, peroxytrifluoroacetic acid, $O_2$, $O_3$ (ozone), $H_2O_2$ (hydrogen peroxide), ($CH_3$)COOH (tert-butyl hydroperoxide), and magnesium monoperoxyphthalate hexahydrate (MMPP).

12. The emulsion aggregation toner particle according to claim 10, wherein the peracid is meta-chloroperoxybenzoic acid (MCPBA).

13. The emulsion aggregation toner particle according to claim 1, wherein the polyester resin is formed from unsaturated monomers and at least one of the unsaturated monomers is fumaric acid.

14. The emulsion aggregation toner particle according to claim 1, wherein the polyester resin is a member selected from the group consisting of poly(1,2-propylene-diethylene) terephthalte, polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexylene-adipate polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate, polyethylene-pimelate, polypropylene-pimelate, polybutylene-pimelate, polypentylene-pimelate, polyhexylene-pimelate, polyheptadene-pimelate, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and mixtures thereof.

15. The emulsion aggregation toner particle according to claim 1, wherein the bio-based oil is a member selected from the group consisting of jojoba oil, coconut oil, corn oil, cottonseed oil, olive oil, palm oil, palm kernel oil, rapeseed oil, almond oil, cashew oil, hazelnut oil, peanut oil, macadamia oil, mongongo oil, pine nut oil, pistachio oil, walnut oil, bottle gourd oil, buffalo gourd oil, pumpkin seed oil, watermelon seed oil, acai oil, blackcurrant seed oil, borage seed oil, evening primrose oil, carob pod oil, amaranth oil, apricot oil, apple seed oil, argan oil, artichoke oil, avocado oil, babassu oil, ben oil, borneo tallow nut oil, cape chestnut oil, cocoa butter, algaroba oil, cocklebur oil, poppyseed oil, cohune oil, dika oil, false flax oil, flax seed oil, soybean oil, sunflower oil, grape seed oil, hemp oil, kapok seed oil, lallemantia oil, marula oil, meadowfoam seed oil, mustard oil, nutmeg butter, nutmeg oil, okra seed oil, papaya seed oil, perilla seed oil, pequi oil, pine nut oil, poppyseed oil, prune kernel oil, quinoa oil, ramtil oil, rice bran oil, royle oil, sacha inchi oil, camellia oil, thistle oil, tomato seed oil, wheat germ oil, tong oil, linseed oil, safflower oil, sesame oil, and combinations thereof.

16. The emulsion aggregation toner particle according to claim 1, wherein the bio-based oil comprises eicosenoic acids and alcohols in an amount of from about 1% to about 30% by weight of the bio-based oil.

17. The emulsion aggregation toner particle according to claim 1, wherein the bio-based oil is present in an amount of from about 0.1% to about 25% by weight of the toner particles.

18. The emulsion aggregation toner particle according to claim 5, wherein the polyester-wax resin emulsion comprises about 30% solids by weight and has a volume average diameter of about 150 nanometers.

19. The emulsion aggregation toner particle according to claim 5, wherein the method further comprises:
forming a pre-toner mixture comprising the polyester-wax resin emulsion;
aggregating particles from the pre-toner mixture;
halting the aggregating of the particles; and
coalescing the particles to form toner particles.

* * * * *